D. MINICH.
Boring-Machine.
No. 168,170. Patented Sept. 28, 1875.
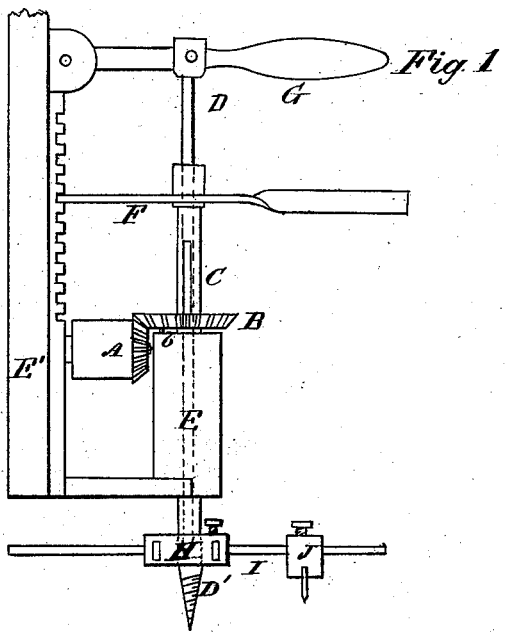
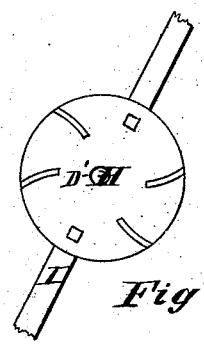
Fig. 2
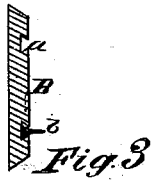
Fig. 3
Witnesses
Frank Hartman
J. B. Connolly
Inventor
Daniel Minich
By Connolly Bros
Attorneys

UNITED STATES PATENT OFFICE

DANIEL MINICH, OF PHILADELPHIA, PENNSYLVANIA, ASSIGNOR OF ONE-HALF HIS RIGHT TO OSBORN CONRAD, OF SAME PLACE.

IMPROVEMENT IN BORING-MACHINES.

Specification forming part of Letters Patent No. 168,170, dated September 28, 1875; application filed September 5, 1874.

*To all whom it may concern:*

Be it known that I, DANIEL MINICH, of Philadelphia, in the county of Philadelphia and State of Pennsylvania, have invented a certain new and useful Improvement in Boring-Machines; and I do hereby declare the following to be a full, clear, and exact description of the invention, such as will enable others skilled in the art to which it pertains to make and use it, reference being had to the accompanying drawings, which form part of this specification.

My invention has for its object the furnishing of a device for sawing, turning, and boring.

As a saw it is particularly designed for use where circular openings are to be cut, which, ordinarily, require considerable skill and time to make perfect. This tool does away with the necessity for guiding, for the cutting is done by a saw made in the form of a segment of a cylinder, with the teeth cut on the edge, which is at right angles to the axis. This is set on an arm fixed to a revolving shaft, and, by suitable devices, is adapted to any radius which may be required, pressure upon the surface of the material to be cut being obtained from above by devices hereinafter explained, and the center being maintained by a pin actuated in the same manner as the pressure. As a turning-tool it has peculiar advantages also.

Fixed to the revolving shaft is a circular cutter-head. The center is kept true and the downward pressure maintained in the same manner as in sawing. The boring facilities are the same, the auger-bit being adjusted into the recess left by the withdrawal from above of the center-pin. The combination of the three devices in one forms a useful and labor-saving machine, whose merits are intrinsic and very evident.

Figure 1 is a side elevation, in which A is an ordinary band, beveled, and gear-wheel combined, which engages with the beveled gear-wheel B, kept in gear by means of a circular dovetail groove, *a*, in which runs a bolt, *b*, with corresponding head, and which is firmly embedded in the bearing of the shaft. The shaft through which the center-pin D is allowed to move freely is revolved by means of a perpendicular groove on its outside surface, in which runs a pin fixed to the gear-wheel B. E is the bearing of the shaft C, and is attached to the base or body of the machine. Along the side of the upright E', and facing toward the shaft, is a rack on which catches the elongated pawl and lever F. G is a lever, pivoted to and bearing upon the center-pin D. H is a circular disk, fixed to and revolving with the shaft C, on whose under side are slots, recesses, or re-enforcements for the adjustment of the cutters when they are required. In the periphery of this disk there are suitable recesses for the reception of the arm I, which is held in place by adjusting-screws. On the arm I is in like manner placed the adjustable saw-clamp J, in which is set the segmental saw. D' represents the boring-bit, fitting the recess in the center of the cutter-head H when the center-pin D is withdrawn. Fig. 2 is a view of the disk, with cutters attached, for the purpose of turning. Fig. 3 is a vertical section of the beveled gear-wheel, showing the circular dovetailed slot.

The power is applied by means of a band to the wheel A, which communicates its motion to the wheel B, which, in turn, gives a rotary motion to the shaft C, and thus the saw, cutter, or auger-bit is made to revolve. The center is fixed and maintained by means of the lever G.

The downward pressure of the saw, cutter, or auger is obtained by means of the elongated pawl and lever F, which works on a movable fulcrum in the shape of the upright rack, and which lever bears down upon the shaft by means of an eye and collar on the lever and shaft, respectively, thus always keeping the cutting-edge of the saw, cutter, or auger forced down upon the material to be operated upon.

Having described my invention, I claim as new—

1. The combination of the rotary adjustable shaft D, head H, arm I, adjustable saw-clamp J, gearing A B, rack-frame E', lever G, and rack-lever F, substantially as shown and described.

2. The combination, with the frame E', of bearing E, adjustable shaft D, arm I, and adjustable saw-clamp J, substantially as shown and described.

3. The slotted cutter-head H, supporting the arm I, upon which is arranged the adjustable saw-clamp J.

4. The combination, with the shaft-bearing E, sliding shaft C, and gear-wheel A, of the grooved wheel B and headed bolt or pin $b$, as and for the purpose specified.

In testimony that I claim the foregoing I have hereunto set my hand this 12th day of August, 1874.

DANIEL MINICH.

Witnesses:
   JNO. A. BELL,
   FRANK HARTMAN.